United States Patent
Lhommeau et al.

(10) Patent No.: US 12,098,652 B2
(45) Date of Patent: Sep. 24, 2024

(54) COMPOSITE PART, IN PARTICULAR FOR AN AIRCRAFT TURBINE ENGINE

(71) Applicant: SAFRAN AIRCRAFT ENGINES, Paris (FR)

(72) Inventors: Tony Alain Roger Joël Lhommeau, Moissy-Cramayel (FR); Damien Bruno Lamouche, Moissy-Cramayel (FR); Mattéo Minervino, Moissy-Cramayel (FR); Julie Valérie Clara Lavigne, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 23 days.

(21) Appl. No.: 18/252,753

(22) PCT Filed: Nov. 17, 2021

(86) PCT No.: PCT/FR2021/052026
§ 371 (c)(1),
(2) Date: May 12, 2023

(87) PCT Pub. No.: WO2022/106780
PCT Pub. Date: May 27, 2022

(65) Prior Publication Data
US 2024/0003260 A1 Jan. 4, 2024

(30) Foreign Application Priority Data
Nov. 17, 2020 (FR) .................. 2011756

(51) Int. Cl.
*F01D 5/28* (2006.01)
*F01D 21/00* (2006.01)

(52) U.S. Cl.
CPC .......... *F01D 5/282* (2013.01); *F01D 21/003* (2013.01); *F05D 2240/12* (2013.01);
(Continued)

(58) Field of Classification Search
CPC ...... F01D 5/282; F01D 21/003; F01D 21/045; F05D 2240/12; F05D 2240/30;
(Continued)

(56) References Cited

U.S. PATENT DOCUMENTS

| 3,371,250 A * | 2/1968 | Ross | H05K 7/06 |
| | | | 174/254 |
| 11,199,094 B2 * | 12/2021 | Joudon | F01D 5/14 |

(Continued)

FOREIGN PATENT DOCUMENTS

| DE | 102008058882 A1 * | 6/2010 | .......... B29C 70/885 |
| DE | 102018008724 A1 * | 5/2020 | .......... G01N 27/026 |

(Continued)

OTHER PUBLICATIONS

Bash et al. Manufacture and Electrical Properties of Constantan (Sep. 1919) 2023-12-13_21-25-39 (Year: 1919).*

(Continued)

*Primary Examiner* — Justin D Seabe
*Assistant Examiner* — Wayne A Lambert
(74) *Attorney, Agent, or Firm* — CHRISTENSEN O'CONNOR JOHNSON KINDNESS PLLC (57) ABSTRACT

A part made of composite material, in particular for an aircraft turbine engine, includes a body produced from fibers woven in three dimensions and immersed in a resin, in particular an organic or polymer resin. The part has at least one crack sensor capable of detecting a crack in the part, at least one link element connected to the sensor and configured to transmit a signal(S), in particular to a member outside of the part, when a crack in the part is detected. The crack sensor has at least one conductive wire woven with the fibers of the body, and the link element is configured to measure the resistance of the conductive wire and to wirelessly transmit the signal.

25 Claims, 6 Drawing Sheets

(52) U.S. Cl.
CPC ...... *F05D 2240/30* (2013.01); *F05D 2260/80* (2013.01); *F05D 2300/6034* (2013.01)

(58) Field of Classification Search
CPC ......... F05D 2260/80; F05D 2300/6034; F05D 2300/603; Y02T 50/60; G01M 5/0016; G01M 5/0033; G01M 5/0083
See application file for complete search history.

(56) References Cited

U.S. PATENT DOCUMENTS

| | | | |
|---|---|---|---|
| 2005/0198967 A1 | 9/2005 | Subramanian | |
| 2005/0228208 A1* | 10/2005 | Lemistre | A61N 2/00 600/9 |
| 2007/0186677 A1* | 8/2007 | Zunino, III | G01M 5/0091 73/849 |
| 2010/0014982 A1* | 1/2010 | Haje | F01D 5/282 416/241 R |
| 2011/0044797 A1* | 2/2011 | Roberts | B29C 70/882 174/209 |
| 2011/0122591 A1* | 5/2011 | Hucker | B29C 70/22 174/250 |
| 2014/0013836 A1* | 1/2014 | Stilin | F01D 5/282 73/112.01 |
| 2014/0326058 A1* | 11/2014 | Broughton | F01D 21/003 73/112.01 |
| 2015/0098819 A1* | 4/2015 | Tourin | G01M 5/0091 416/61 |
| 2016/0103087 A1* | 4/2016 | Zhang | G01N 27/24 324/71.1 |
| 2021/0156751 A1 | 5/2021 | Valembois et al. | |
| 2022/0178262 A1* | 6/2022 | Sudre | C04B 35/62884 |

FOREIGN PATENT DOCUMENTS

| | | | | |
|---|---|---|---|---|
| EP | 2279852 A1 * | 2/2011 | ........... | B29C 70/882 |
| EP | 3 557 214 A1 | 10/2019 | | |
| EP | 3 653 840 A1 | 5/2020 | | |
| FR | 2 865 539 A1 | 7/2005 | | |
| FR | 3004748 A1 * | 10/2014 | ............. | F01D 5/005 |
| FR | 3010523 A1 * | 3/2015 | ............. | F01D 5/282 |
| WO | WO-2009063181 A1 * | 5/2009 | .......... | G01M 11/086 |
| WO | 2010/092426 A2 | 8/2010 | | |
| WO | WO-2012131032 A2 * | 10/2012 | ............. | F03D 17/00 |
| WO | 2019/234601 A1 | 12/2019 | | |

OTHER PUBLICATIONS

De Vries et al. DE 10 2008 058 882 Espacenet—English Machine Translation (Year: 2010).*
Stotenjohannes et al. WO2012131032 Espacenet—English Machine Translation (Year: 2012).*
International Search Report mailed Feb. 7, 2022, issued in corresponding International Application No. PCT/FR2021/052026, filed Nov. 17, 2021, 6 pages.
Written Opinion mailed Feb. 7, 2022, issued in corresponding International Application No. PCT/FR2021/052026, filed Nov. 17, 2021, 7 pages.

* cited by examiner

COMPOSITE PART, IN PARTICULAR FOR AN AIRCRAFT TURBINE ENGINE

FIELD OF THE DISCLOSURE

The present disclosure relates to a composite part, in particular for an aircraft turbine engine, as well as to a method for manufacturing such a composite part.

BACKGROUND

The technical background comprises in particular the documents WO-A1-2019/234 601, EP-A1-3 653 840, FR-A1-2 865 539, US-A1-2005/0198967, EP-A1-3 557 214 and WO-A2-2010/092 426.

In a known way, a turbine engine extending along a turbine engine axis allows the aircraft to be displaced from an airflow entering the turbine engine and flowing from upstream to downstream. Hereafter, the terms "upstream" and "downstream" are defined in relation to the axis of the turbine engine oriented from upstream to downstream. Similarly, the terms "inside" and "outside" are defined in a radial direction with respect to the axis of the turbine engine.

In addition, the turbine engine comprises at least one compressor, a combustion chamber and at least one turbine to drive the compressor in rotation. The turbine engine comprises an upstream fan allowing to accelerate the airflow from upstream to downstream in the turbine engine, comprising vanes extending generally in a same plane transverse to the turbine engine axis.

The vanes, in particular those made of composite materials, are particularly parts for which it is important to be able to detect the formation of a crack. This is carried out by conventional non-destructive methods, such as visual observation, by acoustic, thermal measurement or X-ray tomography. However, the visual observation is limited to visually detectable defects on the surface of the part.

The disadvantage of these conventional methods is that they are time-consuming to implement, and can take several hours to complete for a single part. In addition, these methods may require the use of special apparatus and/or are difficult to implement when the part is mounted on the engine.

Also, such methods are implemented periodically, defined at the time of the design of the part, or after an event, in particular when the part is suspected of having been impacted, in particular during an inspection of a vane following the ingestion of a FOD, for "Foreign Object Debris", designating any type of substance, debris or element, whether mechanical or not, which is totally foreign to an aircraft but which can cause it damage. This specific inspection then requires the part to be dismantled and sent to an approved centre for inspection.

Furthermore, the methods currently used depend on the type of manufacture of the part to be checked. The present application concerns a part comprising a body obtained by three-dimensional weaving of fibres and immersed in a resin. The three-dimensional (3D) weaving is a particular technique which is carried out, for example, by means of a Jacquard-type loom and which allows to produce a three-dimensional body or preform with a shape and dimensions close to those of the final part to be produced. The body then comprises weft yarns intermingled with warp yarns (the weft and warp yarns being formed by the fibres), which is well known to the person skilled in the art specialized in this technique.

This technique is different from a draping technique in which fabrics or fibre webs are layered to form the body of the part. This technique is also different from a winding technique in which fibres are wound in a lattice around nodes.

The present disclosure proposes a solution to at least some of the above problems.

SUMMARY

The disclosure concerns a part made of composite material, in particular for an aircraft turbine engine, comprising:
  a body made of fibres woven in three-dimensions and immersed in a resin, in particular an organic or polymer resin,
  at least one crack sensor configured to detect a crack in the part, and
  at least one link element connected to the crack sensor and configured to transmit a signal, in particular to a member outside of the part, when a crack in the part is detected.

According to the disclosure, the crack sensor comprises at least one conductive wire woven with the fibres of the body and extending into an area of the body in which the presence of the crack is to be monitored, and the link element is connected to ends of the conductive wire and is configured to measure the resistance of the conductive wire and to wirelessly transmit the signal, when the measured resistance of the conductive wire is above a predetermined threshold.

The conductive wire of the disclosure extends into the area of the part in which it is sought to determine whether there is a crack. It allows to detect the presence of a crack anywhere on the part and the link element allows this information to be transmitted.

The disclosure thus proposes to be able to decide on the operability of the part by an in-situ means including the crack sensor and the link element. Furthermore, this means is non-destructive and does not require the part to be dismantled. In addition, this means has a very low impact on the mass of the part.

On the other hand, the link element is a wireless means allowing to facilitate the detection of a crack formation, in particular on movable parts, such as vanes. Thanks to the RFID technology in particular, wire connections can be dispensed with and a solution can be found that has a very low impact on the mass.

The conductive wire is woven with the fibres of the preform and is thus integrated into the preform.

The part according to the disclosure may comprise one or more of the following characteristics, taken alone or in combination with each other:
  the fibres are made of carbon and the conductive wire is surrounded by an insulating sheath, preferably made of the same material as the resin;
  the conductive wire has a diameter between 0.05 mm and 8 mm;
  the conductive wire forms at least one C- and/or U-shaped loop;
  the conductive wire is made of a material selected from copper, aluminium, iron, silver, nickel and their alloys, in particular constantan;
  the threshold is between $1.01 \times R$ and $1.10 \times R$, in particular between $1.02 \times R$ and $1.08 \times R$, in particular equal to $1.05 \times R$, where R is the initial resistance of the conductive wire;

the link element comprises an RFID tag, in particular configured to operate at a frequency of between 860 and 960 MHz;

the part forms a vane, in particular a fan vane.

The disclosure also relates to an aircraft turbine engine, comprising a part as described above. Specifically, the part being a fan vane, the turbine engine comprises a fan casing surrounding the fan vane and carrying a reading device, such as an RFID reader.

The disclosure also relates to a method for manufacturing a part, as described above, wherein it comprises:
a) an insertion step consisting in inserting the conductive wire into a woven fibre preform, the conductive wire extending along the area in which a crack is to be monitored,
b) a joining step consisting in affixing the link element to the preform or integrating the link element into the preform and connecting ends of the conductive wire to the link element so that it can measure the resistance of the conductive wire, and
c) an injection step consisting in injecting the resin, in particular the organic or polymer resin, into the preform previously placed in a mould, so as to produce the body of the part and to solidify the assembly.

According to an alternative embodiment of the method, the injection step c) is preceded by a step of electrically insulating the link element and the link to the conductive wire.

DESCRIPTION OF THE DRAWINGS

The disclosure will be better understood and further characteristics and advantages will become apparent from the following detailed description comprising embodiments, given by way of illustration with reference to the appended figures and presented as non-limiting examples, which may serve to complete the understanding of the present disclosure and the disclosure of its embodiment and, where appropriate, contribute to its definition, whereupon.

DETAILED DESCRIPTION

Figure 1:
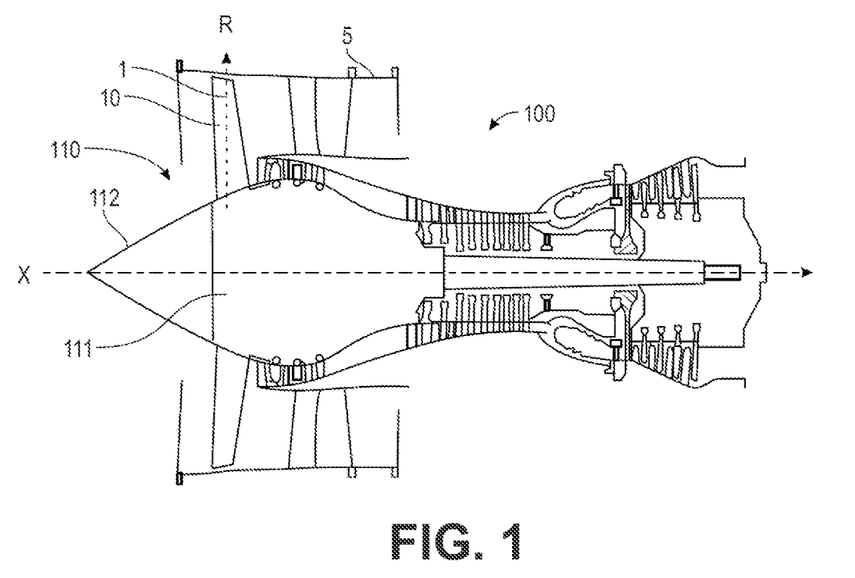
FIG. 1 is a schematic representation of a turbine engine in longitudinal cross-section.

As shown in FIG. 1, which is a schematic representation in longitudinal section of a turbine engine 100 of an aircraft, the disclosure is specific to a part 10 made of composite material, in particular for the turbine engine 100.

The part 10 may, for example, be a vane 1, in particular a vane 1 of a fan 110 of the turbine engine 100. In particular, the turbine engine 100 comprises in particular a casing 5 of the fan 110 surrounding the vanes 1 of the fan 110.

The turbine engine 100 extends along a turbine engine axis X and allows the aircraft to be displaced from an airflow entering the turbine engine 100 and flowing from upstream to downstream.

In a known manner, the turbine engine 100 comprises at least one compressor, an annular combustion chamber and at least one turbine (these elements not shown), to drive the rotor of the compressor in rotation.

The turbine engine 100 comprises a fan 110 upstream allowing to accelerate the airflow from upstream to downstream in the turbine engine 100. The fan 110 comprises a disc 111, rotationally secured to a shaft of the compressor, comprising housings, distributed at the periphery of the disc 111, in which the vanes 1 are respectively mounted by axial insertion along the turbine engine axis X from upstream to downstream.

The vanes 1 generally extend in a single plane transverse to the turbine engine axis X. In the example of embodiment shown, the turbine engine 100 comprises a cone 112 which is mounted upstream of the disc 111.

The part 10 is made of a composite material comprising fibres 41 immersed in a resin, for example an organic or polymer resin. Some of the fibres 41 are electrically conductive (also referred to as electroconductive fibres) and other fibres 41 are electrically non-conductive (also referred to as non-electroconductive fibres). The resin is not electrically conductive. The electrically conductive fibres are preferably metal fibres and/or carbon fibres. The non-electroconductive fibres are preferably glass fibres and/or thermoplastic fibres (aramid, polyethylene, polyester, etc.).

The fibres 41 are woven together so as to form at least one three-dimensional preform to be immersed in the resin. The resin in this example is thermosetting but could be of a different nature. It can be an epoxy or bismaleimide resin.

More specifically, the vane 1 comprises a root, a blade 13, a leading edge 1a and a trailing edge 1b.

Figure 2:
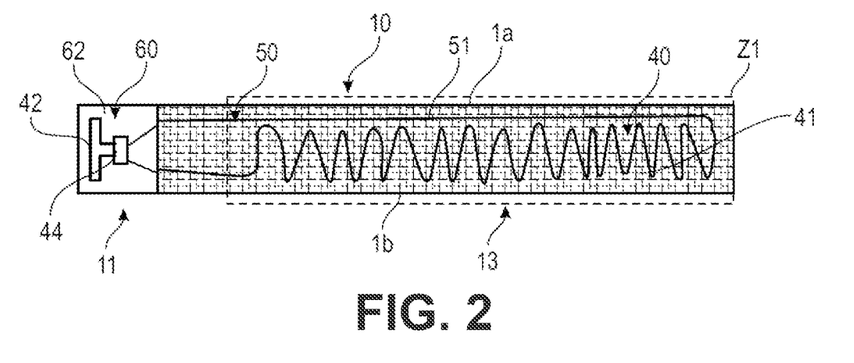
FIG. 2 is a schematic cross-sectional view of a part comprising a crack sensor and a link element according to the disclosure.

Reference is now made to FIG. 2 which is a schematic cross-sectional representation of a part 10 comprising a crack sensor 50 and a link element 60. The disclosure is specific to the part 10 made of composite material, such as the vane 1, comprising a body 40 made of the woven fibres 41 and immersed in the resin. The part 10 also comprises at least the crack sensor 50 for detecting a crack of the part 10. The part 10 also comprises at least one link element 60 connected to the crack sensor 50 and configured to measure a resistance and to transmit a signal S, in particular to a member outside (not shown) the part 10, when a crack of the part 10 is detected.

The crack sensor 50 comprises at least one conductive wire 51 present in an area Z1 of the body 40 which is to be monitored for an occurrence of a crack, i.e. where a crack may occur and should therefore be detected.

Advantageously, the crack sensor 50 is integrated inside the body 40 so that the sensor can detect a crack in a volume of the part to be monitored. For this purpose, the conductive wire 51 is woven with the fibres 41 of the body 40. The weaving of the conductive wire 51 allows it to be oriented in different directions and to travel a complex path allowing to optimise the monitored area Z1 of the part. According to a more specific example, the fibres 41 are in particular made of carbon and the conductive wire 51 is surrounded, for example, by an insulating sheath (not shown) allowing to prevent the resistive value of the conductive wire 51 from being modified by electrical contact or short-circuit with other conductive elements present in the part 10, such as for example a reinforcement of the preform, in particular fibres 41 made of carbon, which would have the effect of rendering it unsuitable for the detection function of the sensor.

Advantageously, as the measurement voltage is low, the thickness of the insulating sheath can be small but must resist wear during its passage through a weaving machine allowing to manufacture the part 10. The material of the insulator used for the insulating sheath can in particular be a polymer insulator compatible with the material of the preform, preferably made of a polymer insulator compatible with the resin, ideally from the same family as the resin, for example an epoxy insulating sheath when the resin has an epoxy base.

In particular, the conductive wire 51 may have a diameter of between 0.05 mm and 8 mm. Such a diameter allows it to be large enough to resist the voltage of the conductive wire 51 and small enough to be compatible with the looms allowing to manufacture the part 10. In particular, the conductive wire 51 may form, for example, one or more C- and/or U-shaped loops, allowing for the best possible coverage of an area to be monitored, such as the area Z1.

The conductive wire 51 is made of an electrically conductive material with a known electrical resistance. The material is chosen, in particular, from among copper, aluminium, iron, silver, nickel and their alloys, and is for example made of constantan. Constantan is an alloy.

The conductive wire 51 is, for example, made of constantan, which is an alloy with an electrical resistance that is highly independent of temperature, allowing to obtain a more accurate value than with other types of material. In addition, it is not necessary to compensate for the error by a potential increase in temperature.

The link element 60 is configured to measure the resistance of the conductive wire 51. According to one embodiment, the link element 60 comprises an RFID tag 62 for the wireless transmission of a signal S, in particular the transmission of the information of the evolution in resistance of the conductive wire 51, in particular when the resistance of the conductive wire 51 is above a predetermined threshold.

The link element 60, such as the RFID tag 62, comprises an antenna 42 and one or more electronic components 44 such as a chip. The acronym "RFID", or "Radio Frequency Identification" refers to a support of the radio identification type.

The electronic components 44 of the link element are configured, for example, to inject a current into the conductive wire 51 and to measure the voltage through the terminals of the conductive wire. They can further be configured to compare the measured voltage value with a reference value, such as a threshold value, and to emit a signal when the measured value is greater than the reference value.

The link element 60, such as the RFID tag 62, may be integrated into the part 10, for example in the preform, or it may be affixed to the preform before the resin is injected.

If the part 10 cracks, with the conductive wire 51 "trapped" in the resin, the crack causes the conductive wire 51 to break. The conductive wire 51 will therefore also crack following the crack in the part 10. This will have a direct impact on the resistance value of the conductive wire 51.

Since the link element 60, in particular the RFID tag, has a function of measuring the electrical resistance of the conductive wire 51, it is possible to know that the part 10 is cracked or delaminated if the value of the electrical resistance of the conductive wire 51 is higher than the predetermined threshold.

The predetermined threshold is in particular between $1.01 \times R$ and $1.10 \times R$, in particular between $1.02 \times R$ and $1.08 \times R$, in particular equal to $1.05 \times R$, where R is an initial resistance of the conductive wire 51. If the resistance of the conductive wire 51 is identical with a variation of between 1% and 10%, in particular between 2% and 8%, in particular 5% of the initial value, then it can be considered that there is no break in the conductive wire 51 and therefore no crack in the part 10 in the area Z1.

Conversely, if the value of the electrical resistance of the conductive wire 51 is outside the predetermined ranges, in particular defined above, then it can be considered that there has been an evolution in the integrity of the conductive wire 51 and thus the presence of a crack in the part 10.

Figure 3:
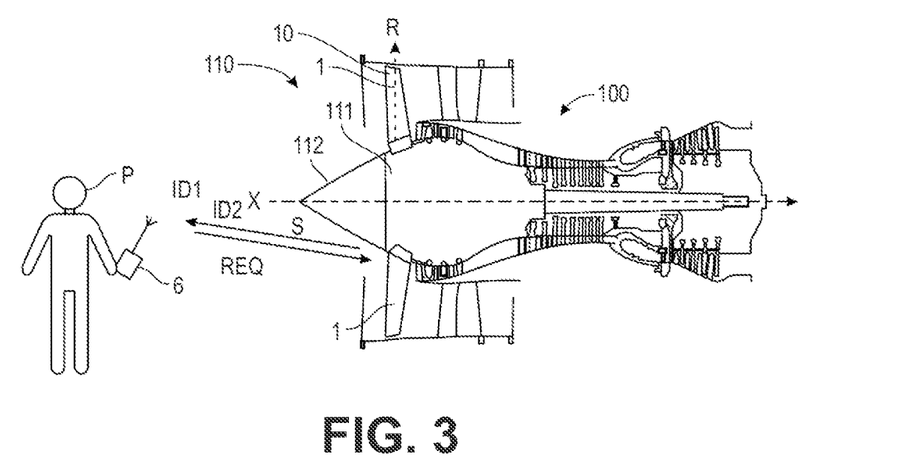
FIG. 3 is a schematic representation of a step of reading the link element according to the disclosure.

FIG. 3 is a schematic representation of a reading step of the link element 60 according to the disclosure. In the particular example shown in FIG. 3, it may be advantageous that the link element 60 can, in a first instance, preferably be positioned as close as possible to the centre of rotation of the system on which the part 10, in this case the vane 10, is mounted, i.e. here the centre of rotation of the turbine engine 100. Indeed, if the part 10, in this case the vane 10, is rotating, this allows in particular an operator P using manually a reading device 6, in particular a reader 6, in particular an RFID reader 6, positioned close to the centre of rotation (which it can do easily), to be able to recover successively or at once the data of the different link elements 60, in particular the different RFID tags 62, present on the parts 10, in this case the vanes 1, in a collective manner.

Figure 4:
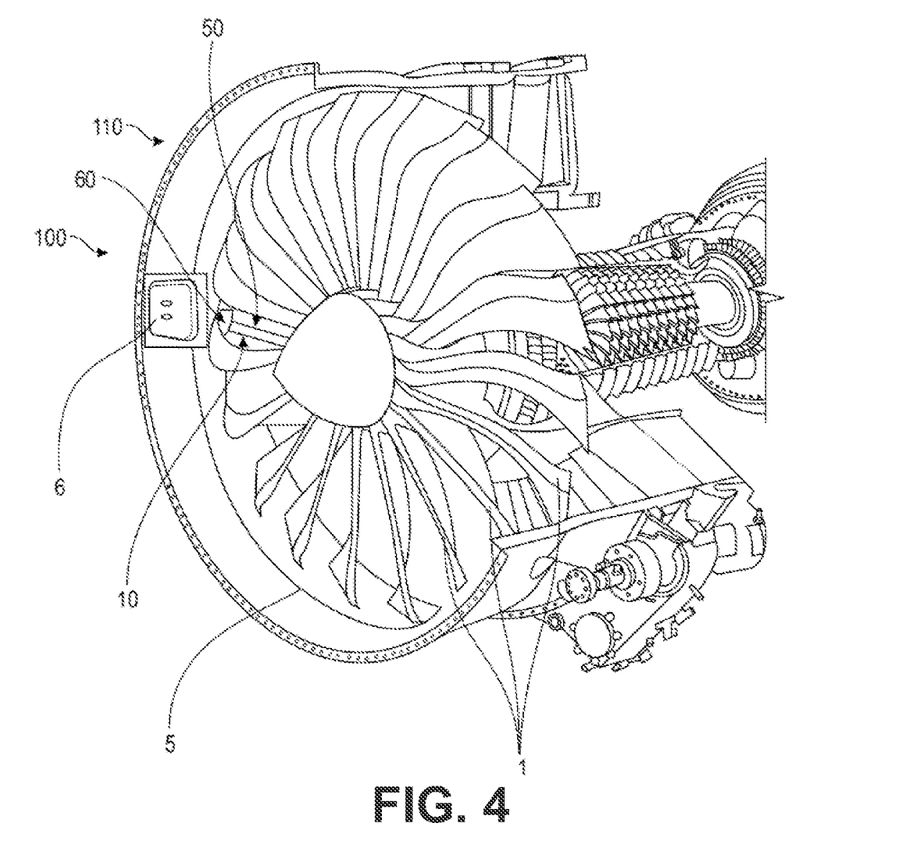
FIG. 4 is a schematic perspective view of a turbine engine fan with a link element and a reading device according to the disclosure.

FIG. 4 is a schematic representation in perspective of the fan 110 of the turbine engine 100 equipped with the link element 60, in particular the RFID tag 62, and the reading device 60, in particular the RFID reader 60, corresponding to an implementation of the disclosure allowing a recovery of the data of the different link elements 60, in particular the different RFID tags 62, present on the parts 10, in this case the vanes 1, in a collective manner according to an automatic process. In this alternative embodiment shown in FIG. 4, the link element 60 is located in an area remote from the cone 112 of the fan 110.

The link element 60 is here positioned on an outer end of the part 10, in this case at the distal end of the vane 1, thus allowing it to be easily read by a reading device 6 placed nearby on a non-movable portion, for example attached to the casing 5 of the fan 110.

As the reading device 6 is attached to a non-movable portion, when the part 10 passes the reading device 6, it can recover the data sent by link elements 60, such as RFID tags 62, from the different parts 10, in this case from the vanes 1 of the fan 110.

The data transmission, in particular RFID, is sensitive to the electromagnetic disturbances. However, the area of the cone of the fan 110 comprises many metal parts that produce an electromagnetic shielding and form a Faraday cage. The remoteness of the link element 60 with respect to the cone of the fan 110 allows to prevent electromagnetic disturbances from affecting the transmission of the data of the RFID tags and of the signal S.

Furthermore, in order to maximise the detection distance of the link element 60, in particular the RFID tag 62, by the appropriate reading device 6, proximity to a conductive element should be avoided.

The resin used for the manufacture of the vanes 1 of the fan 110 is, by its nature, insulating, whereas the carbon used for the fibres 41 for weaving the preform is a good electrical conductor. Thus, according to one aspect of the disclosure, the link element 60 is positioned in an area of the part 10, in this case the vane 1, with as little carbon as possible.

In more detail, the positioning of the link elements 60 in a place rich in non-electroconductive, or "non-metallic", fibres 41 allows to reduce a disturbance of the electromagnetic field and/or of the antenna 42 of the link element 60 and/or a dissipation induced by the electroconductive fibres 41 such as the carbon fibres 41, and to increase the detection distance by a few centimetres, in particular from 5 cm to 25 cm, in particular from 10 cm to 20 cm, up to a few metres, in particular from 0.5 m to 10 m, in particular from 2 m to 8 m.

In addition, in order to ensure that the link element 60 does not have a detrimental effect on the mechanical behaviour of the body 40, the choice of the design and the position of the link element 60 in the part 10 are preferably carefully defined.

Furthermore, the link element 60, in particular the RFID tag 62, is integrated into the part 10, in particular immersed in the resin, and is therefore protected from the outer environment.

Figure 5:
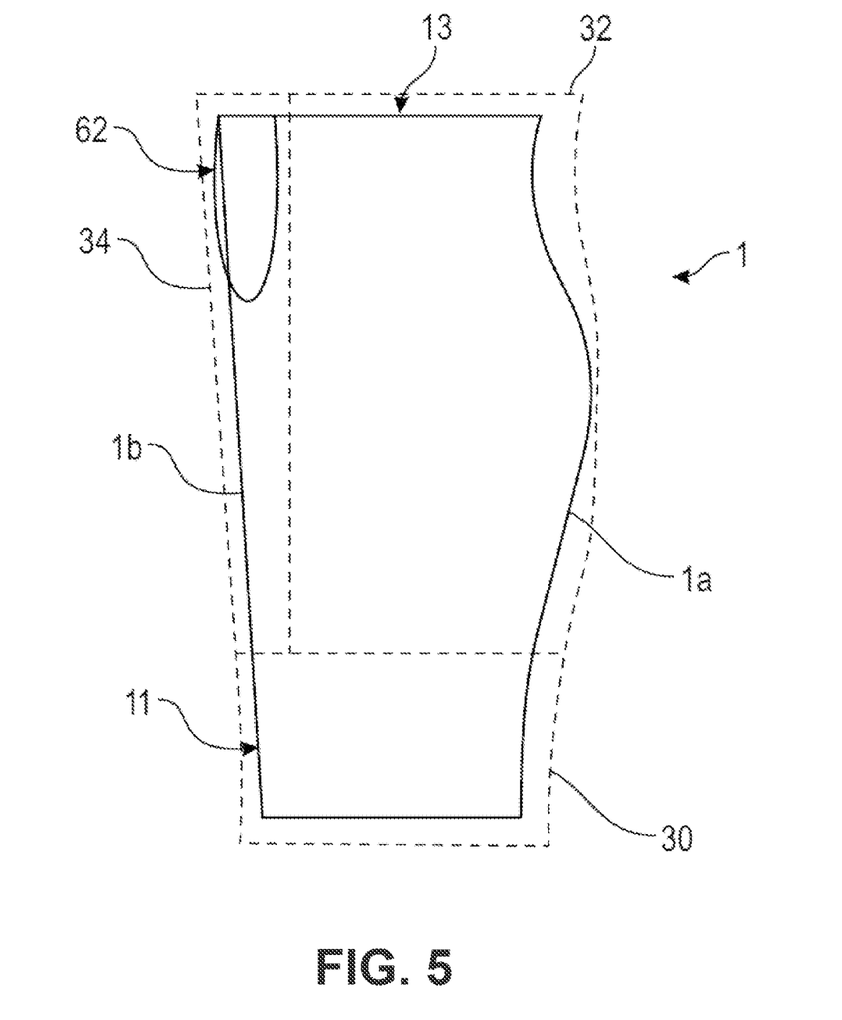
FIG. 5 is a schematic side view of a fan vane with a link element according to the disclosure.

Reference is now made to FIG. 5, which is a schematic representation of the part 10 according to the present disclosure as a vane. In particular, FIG. 5 shows a side view of the vane 1 of the fan 110 with the link element 60.

According to the example of embodiment shown in FIG. 5, the root 11 of the vane 1 is formed from a woven preform or a first portion of a woven preform 30 comprising only electrically conductive fibres 41, in particular woven carbon fibres 41. This is also the case for a major portion of the blade 13 and, in particular, the leading edge 1a, which is made from a preform or a second preform portion 32 thus comprising only electrically conductive fibres 41. The preform is generally single and extends into the first preform portion 30 and the second preform portion 32.

On the contrary, the segment of the blade 13 extending along the trailing edge 1b is made by weaving fibres 41 comprising electrically conductive fibres, in particular carbon fibres, and non-electrically conductive fibres, in particular glass fibres, and thus comprises a preform or a third preform portion 34 made of hybrid material.

The first preform portion 30, the second preform portion 32 and the third preform portion 34 are delimited by dotted rectangles in FIG. 5.

Thus, when it is desired to maximise the detection distance between the reading device and the link element 60, in particular the RFID tag 62, in order to allow, in particular, a method for collecting automatic and collective data from all the RFID tags, corresponding to the mode of collecting data illustrated in FIG. 4, this link element 60 will preferably be located in the third preform portion 34, which is the one with the fewest electrically conductive fibres 41. The link element 60 is thus positioned in the vicinity of the trailing edge 1b of the vane 1, in the example shown. This is particularly advantageous as it allows to facilitate the detection of the link element 60 from a distance by a reading device 6, corresponding to a method for collecting data illustrated in FIG. 4.

In one embodiment, the link element 60, in particular the RFID tag 62, is positioned on the part 10 in an area which will be sufficiently close to the reading device 6, when the latter interrogates the tag, to allow this RFID tag 62 to be powered, via its antenna: the electronics of the RFID tag can then determine the resistance of the conductive wire 51 integrated in the part 10 transmit a signal S with the corresponding measurement data towards the reading device.

Indeed, the link element 60, in particular the RFID tag 62, is preferably a passive device, i.e. without battery, but powered by a radio wave generated by the reading device 6, in particular the RFID reader 6.

Alternatively, the link element 60, in particular the RFID tag 62, could comprise a battery. The presence of a battery would allow, for example, a periodic reading of the resistance of the conductive wire. It could also allow to reduce the communication distance between the reading device and the tag.

Figure 6:
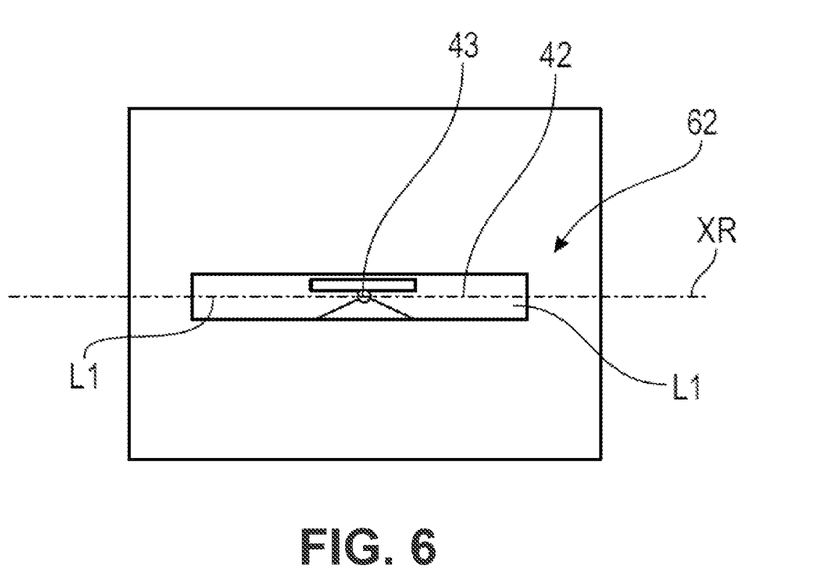
FIG. 6 is a schematic representation seen from above of a link element according to the disclosure.

Preferably, the link element 60, in particular the tag 62, is configured to operate in the UHF band, acronym for Ultra High Frequency, e.g. at a frequency between in particular 860 and 960 MHz.

Where the preform is predominantly formed of electrically conductive fibres, it is preferable that the link element 60 is insulated from these fibres. FIG. 6 is a schematic view seen from above of the link element 60, such as the RFID tag 62, in such a preform.

According to this example of embodiment, the link element 60, such as the RFID tag 62, comprises a ball 43 of dielectric material, typically a polymer, which is intended to protect the electronic chip of the tag and an electrical connection to the antenna 42.

The bulkiest element of the link element 60 is the ball 43 which preferably has a diameter of 5 mm or less. The ball provides isolation from the antenna and electronics and induces a certain thickness to the link element due to its overall dimension.

In one alternative embodiment, the antenna 42 is planar and may extend parallel to a surface of the part 10, such as the surface of the vane 1 or of the blade 13, or between two plies or webs of fibres 41 of the part 10 or of the preform. The antenna 42 has, for example, a thickness of less than or equal to 2 mm, in particular less than or equal to 1 mm, in particular less than or equal to 0.5 mm.

The link element 60, such as the RFID tag 62, as previously described has the advantage of meeting the dimensional, thermal stability and chemical compatibility requirements in the field. Furthermore, the materials of the link element 60, such as the RFID tag 62, are preferably chosen to:

not affect the resin and its curing,
be thermally stable during the possible curing of the resin-impregnated preform and/or the exothermic polymerisation reaction of the resin,
not to disturb the weaving and the preform at the time of closing the mould for manufacturing the vane, and
not to be too bulky.

The ball 43 is, for example, made of polymer. Furthermore, the antenna 42 is, for example, made of copper or aluminium and potentially coated with a thermoplastic or epoxy polymer (PET, PC, Polyimide etc.).

The link element 60, such as the RFID tag 62, may comprise a storage memory. Thus, identification and/or characterisation data ID1, ID2 can be stored, for example a serial number ID1, referred to as SN "serial number", and/or a part number ID2, referred to as PN "part number".

It goes without saying that the storage memory could store a single data or an assembly of data, such as, for example, a measured deformation data of the part 10, a resistance of the conductive wire 51, an exceeding of a resistance threshold of the conductive wire 51, a unique identifier allowing to identify in a particular way a part or more than two identification data such as an identifier of the manufacturer (CAGE code etc.), a date of manufacture, a degree of sensitivity, in particular to specific fluids, an operating authorisation reference, data linked to the operations of the maintenance or logistics of the part 10, such as an operational status, operations carried out, etc.

As illustrated in FIG. 3, the antenna 42 of the link element 60, such as the RFID tag 62, is configured to receive a read request REQ and to emit back data, in particular the identification and/or characterisation data ID1, ID2, and/or a signal S, in particular when the resistance of the conductive wire 51 is above a predetermined threshold.

A tag using RFID technology is known to the person skilled in the art. In a known way, among the tags according to the RFID technology, a distinction is made between those intended for a use in a "metallic" environment (of the polymer ball type as described above), which are at least 1.5 mm thick for high frequency or UHF operation, those intended for a use in a "non-metallic" or non-conductive environment, which are less than 0.5 mm thick for a UHF application and those intended for a "mixed" use.

The type of RFID tag is chosen according to the type of vane and/or the area where the tag is to be placed.

An RFID tag 62 for a "non-metallic" environment is advantageous because of its thin thickness, and its application is particularly interesting for a vane 1 which has a thin thickness imposed by the aerodynamic constraints. Thus, in the case where the RFID tag 62 is for a "non-metallic" use, the preform should comprise glass fibres 41.

One advantage of using the RFID tag 62 for a "metallic" environment is to relax the integration constraints relative to the environment and in particular in areas of woven preforms comprising no or few non-conductive fibres 41 such as glass fibres.

According to the example illustrated in FIG. 6, the antenna 42 comprises in particular at least one communication lobe L1 oriented along a radio axis XR to receive the read request REQ and to emit in return data, for example the identification and/or characterisation data ID1, ID2 and/or a signal S, for example when a crack in the part 10 is detected.

In particular, the antenna 42 may comprise two communication lobes L1 aligned along a single radio axis XR. Thus, the link element 60, such as the RFID tag 62, can be used in two opposite orientations, in a same direction.

Figure 7:
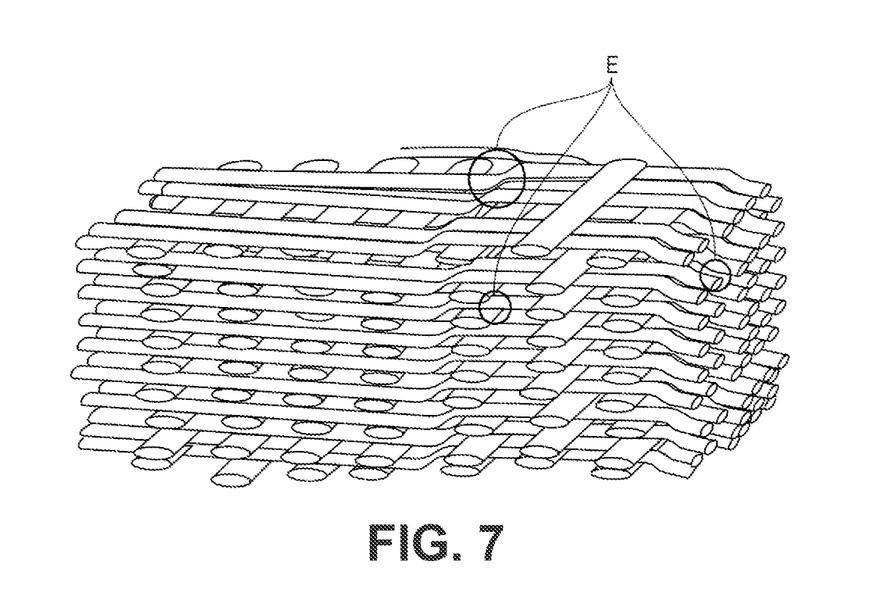
FIG. 7 is a schematic perspective representation of a piece of woven preform in which a link element is positioned according to the disclosure.

FIG. 7 is a schematic perspective representation of a piece of woven preform in which the link element 60 is positioned. In particular, FIG. 7 illustrates a portion of a woven preform of the part 10, in particular of the vane 1, and shows spaces E existing in this preform. The spaces E are suitable for accommodating the ball 43 of the link element 60, such as the RFID tag 62, in the case of a "metallic" environment. The spaces E are located between woven fibres 41. Thus, the ball 43 housed in one of the spaces E is intended to be immersed in the resin that impregnates the preform and thus to be entirely immersed in the resin without impacting the shape of the preform.

The use of the link element 60, such as the RFID tag 62, and its integration into the preform has several advantages including:
  there is no additional specific step to install the link element 60, such as the RFID tag 62, because its integration is provided during the manufacturing of the part 10, in particular the vane 1, before the injection of the resin into the mould for manufacturing the part 10, in particular the vane 1;
  the link element 60, such as the RFID tag 62, is integrated in the part 10, in particular the vane 1, and is therefore unfalsifiable. It cannot be removed without risk of damage to the part 10, in particular the vane 1;
  the link element 60, such as the RFID tag 62, is immersed in the resin. There is therefore no risk of accidental detachment and loss of the link element 60 during operation; and
  a detection of the link element 60, such as the RFID tag 62, without the need to remove the turbine engine and/or the vane.

The antenna 42 of the link element 60, such as the RFID tag 62, also has the advantage:
  to be thin and therefore easily positionable and integrable; and
  to facilitate the detection by the reading device 6, such as the RFID reader 6.

With reference to FIG. 3, a method for individual and collective reading of the identification and/or characterisation data ID1, ID2 of one or more parts 10, in particular vanes 1 of a fan 110 of a turbine engine 100, in particular an aircraft turboshaft engine, as well as a transmitted signal S, in particular when a crack is detected on these parts 10, will now be presented.

In this example, the operator P uses the reading device 6 to ensure a radio identification, in particular the RFID reader 6, and places himself at a distance from the part or the parts 10, i.e., according to the example shown in FIG. 3, at a distance from the turbine engine 100, in particular upstream of the latter so as to be close to the fan 110.

Using the reading device 6, the operator P emits in radio manner the read request REQ which is received in radio manner by the antenna 42 of the link element 60, such as the RFID tag 62.

In response to the read request REQ, the antenna 42 emits a radio signal transmitting data, for example the identification and/or characterisation data ID1, ID2 and the signal S, in particular when a crack in the part 10 is detected. The data transmitted by the antenna 42 is read by the reading device 6. In particular, the identification and/or characterisation data ID1, ID2 and the signal S are emitted by the communication lobes L1 of the antenna 42. Preferably, the read identification and/or characterisation data ID1, ID2 and/or the read measured deformation data DF and the signal S received are stored in the reading device 6 in a computerised manner.

Depending on the emission power of the reading device 6 and the distance between the reading device 6 and the link element 60, the operator can individually read a single link element 60, in this case a single RFID tag 62 of a vane 1 (low power and small distance), or collectively a plurality of link elements 60, in this case a plurality of RFID tags 62 of the vanes 1 of a fan 110 (high power and large distance). In practice, a reading can be made from a distance of a few centimetres (5 cm to 25 cm) up to several metres (0.5 m to 10 m), depending on the link element 60, the reading device 6 and the environment.

Figure 8A:
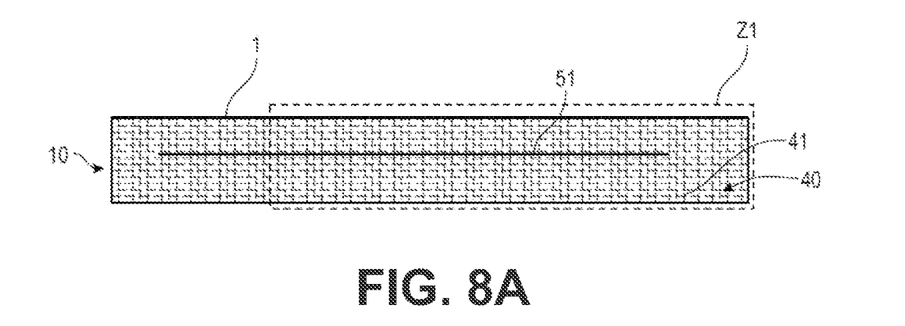
FIGS. 8a, 8b, 8c are schematic representations of the principle of detecting the formation of a crack on a part according to the disclosure.
Figure 8B:
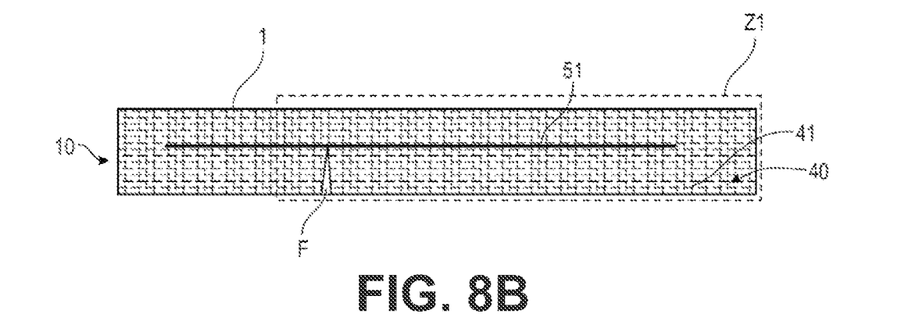
Figure 8C:
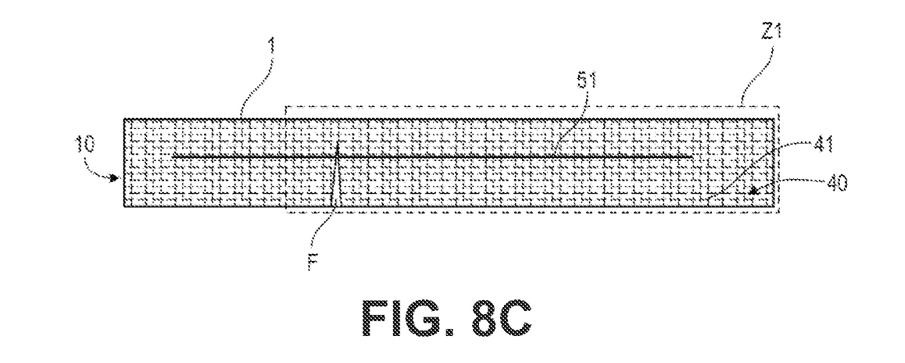

As shown in FIGS. 8a, 8b, 8c, the disclosure also relates to a method for detecting a formation of a crack on the part 10 as described above.

More specifically, the operation of the crack detection and the transmission of a corresponding information is illustrated in more detail in FIGS. 8a, 8b, 8c.

FIG. 8a shows the part 10, such as the vane 1, comprising a conductive wire 51. The resistance of the conductive wire 51 is here equal to the value of the known electrical resistance for the selected material of the conductive wire 51.

In FIG. 8b, a crack F appears on the part 10. However, the crack F does not reach the conductive wire 51. Thus, there is no elongation of the conductive wire 51 and no break in electrical contact. The resistance value of the conductive wire 51 thus remains the same as the initial resistance value of the conductive wire 51.

In FIG. 8c, the crack F reaches the conductive wire 51. The conductive wire 51 integrated in the part 10 is therefore broken or cracked partly or completely. The crack F thus affects the flowing of the current in the conductive wire 51. The value of the resistance of the conductive wire 51 then increases considerably, reaching an infinite value in the case of a completely broken conductive wire 51. This condition is verified by injecting a current into the conductive wire 51. In the case of FIGS. 8a and 8b, the link element or the tag injects this current and measures the voltage through the terminals of the conductive wire 51 to deduce its resistance according to the Ohm's law. In the case of FIG. 8c, the link element or the tag injects this current and measures a zero voltage through the terminals of the conductive wire 51 due to the infinite resistance of the conductive wire.

The increase in the resistance value of the conductive wire 51, beyond a predefined threshold, for example corresponding to an increase of between 1% and 10%, in particular of between 2% and 8%, in particular of 5% of the initial value of the resistance of the conductive wire 51, indicates that there is the presence of a crack in the part 10, in particular in the vane 1, at the level of the area Z1 in which the presence of a crack must be monitored where the conductive wire 51 passes. The link element 60 then sends the signal S, in particular by radio wave, towards the reading device upon request/query of an external reading device.

Figure 9A:
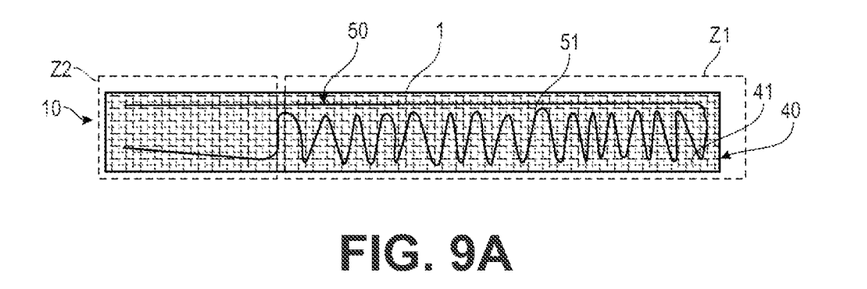
FIGS. 9a, 9b are schematic representations of the method for manufacturing a part according to the disclosure.
Figure 9B:
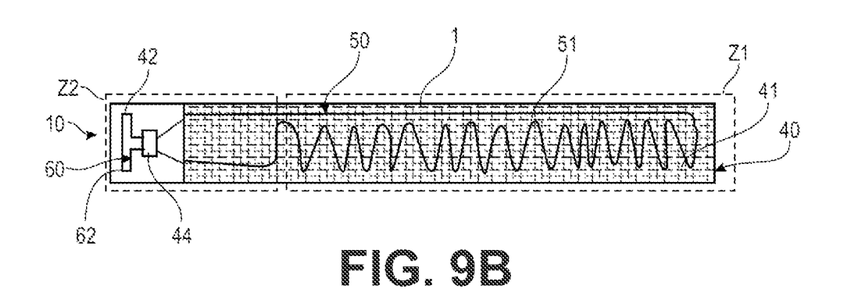

As shown in FIGS. 9a, 9b, the disclosure also relates to a method for manufacturing a part 10, in particular a vane 1, as described above.

Figure 10:
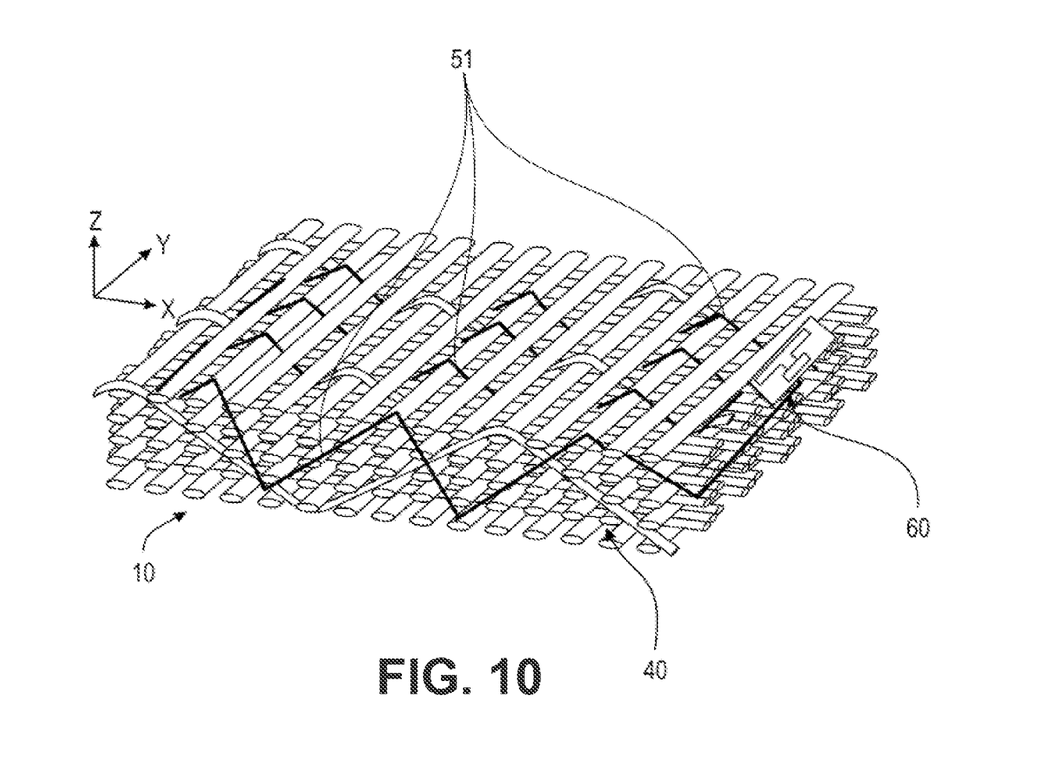
FIG. 10 is a schematic perspective view of a piece of woven preform in which a conductive wire is integrated.

The method comprises an insertion step a), shown in FIG. 9a, consisting in inserting the conductive wire 51 into a woven fibre preform 41. Advantageously, the conductive wire 51 is present in an area Z1 of woven material in which the presence or the formation of a crack is to be monitored. The conductive wire 51 is woven and integrated along a specific path with the weaving machine, in particular to cover a large portion of the area Z1 in which the presence of a crack must be monitored. FIG. 10, for example, shows the path of a conductive wire 51 that is intertwined with the fibres of the body 40. The conductive wire 51 is integrated into the volume of the body, i.e. the path of the wire, together with the aforementioned loops, allows to cover the surface and thickness of the area Z1 to be monitored.

As illustrated in FIG. 9b, the method comprises a joining step b) consisting in affixing the link element 60 to the preform or integrating the link element 60 into the preform and connecting ends of the conductive wire 51 to the link element 60, so that it can measure the resistance of the conductive wire 51 and compare it to the predetermined threshold, as discussed above.

If the value of the resistance of the conductive wire 51 is greater than the predetermined threshold, in particular greater than a value between 1.01×R and 1.10×R, in particular between 1.02×R and 1.08×R, in particular equal to 1.05×R, where R is the initial resistance of the conductive wire 51, then the link element 60 is able to transmit the signal S to the reading device 6 signifying that the part 10 is damaged, in particular by cracking.

The method also comprises an injection step c), shown in FIG. 2, consisting in injecting the resin, in particular the organic or polymer resin, into the preform previously placed in a mould (not shown), so as to produce the body 40 of the part 10, such as the vane 1. Thus, the assembly consisting of the preform, the crack sensor 50 and the link element 60 is solidified.

However, it is necessary that the crack sensor 50, the link element 60, as well as the elements making the connection can withstand the temperature and pressure constraints generated at the time of the injection, in particular a temperature of between 180° C. and 200° C., in particular a typical temperature of 180° C. and a pressure of 20 bar.

The injection step c) of the method may, for example, be preceded by a step of electrically insulating (not shown) the links between the link element 60 and the conductive wire 51.

The disclosure has been described with embodiments in which the part 10 is specifically a vane 1 but can of course be applied to any type of composite material part 10, in particular parts 10 for an aircraft turbine engine.

Of course, the disclosure is not limited to the above-described embodiments, which are provided by way of example only. It encompasses various modifications, alternative forms and other variants that may be envisaged by the person skilled in the art within the framework of the disclosure, and in particular all combinations of the various embodiments described above, which may be taken separately or in combination.

The invention claimed is:

1. A part made of composite material comprising:
  a body made of fibers woven in three-dimensions and immersed in a resin,
  at least one crack sensor configured to detect a crack in the part, and
  at least one link element connected to the crack sensor and configured to transmit a signal(S) when a crack in the part is detected,
  wherein the crack sensor comprises at least one conductive wire woven with the fibers of the body and extending into an area (Z1) of the body in which a presence of the crack is to be monitored, and
  the link element is directly connected to ends of the conductive wire and is configured to measure a resistance of the conductive wire and to wirelessly transmit the signal(S) when the measured resistance of the conductive wire is above a predetermined threshold.

2. The part according to claim 1, wherein the fibers are made of carbon and the conductive wire is surrounded by an insulating sheath.

3. The part according to claim 1, wherein the conductive wire has a diameter between 0.05 mm and 8 mm.

4. The part according to claim 1, wherein the conductive wire forms at least one C-shaped and/or U-shaped loop.

5. The part according to claim 1, wherein the conductive wire is made of a material selected from copper, aluminum, iron, silver, nickel and their alloys.

6. The part according to claim 1, wherein the threshold is between 1.01×R and 1.10×R, where R is an initial resistance of the conductive wire.

7. The part according to claim 1, wherein the link element comprises an RFID tag.

8. An aircraft turbine engine, comprising a part according to claim 1.

9. The turbine engine according to claim 8, wherein the part is a vane of a fan and the turbine engine further comprises a casing of the fan surrounding the vane of the fan and carrying a reading device.

10. A method for manufacturing a part according to claim 1, comprising:

a) an insertion step consisting in inserting the conductive wire into a preform of three-dimensionally woven fibers, the conductive wire being woven with the fibers of the preform and extending into an area (Z1) in which the presence of a crack is to be monitored, b) a joining step consisting in affixing the link element to the preform or integrating the link element into the preform, and connecting ends of the conductive wire to the link element so that the link element can measure the resistance of the conductive wire, and c) an injection step consisting in injecting the resin into the preform previously placed in a mold, so as to produce the body of the part and to solidify the assembly.

11. The manufacturing method according to claim 10, wherein the injection step c) is preceded by a step of electrically insulating the links between the link element and the conductive wire.

12. The part according to claim 1, wherein the resin is an organic or polymer resin.

13. The part according to claim 1, wherein the link element is configured to transmit a signal(S) to a member outside of the part.

14. The part according to claim 2, wherein the insulating sheet is made of the same material as the resin.

15. The part according to claim 5, wherein the conductive wire is made from constantan.

16. The part according to claim 6, wherein the threshold is between 1.02×R and 1.08×R.

17. The part according to claim 16, wherein the threshold is 1.05×R.

18. The part according to claim 7, wherein the RFID tag is configured to operate at a frequency between 860 and 960 MHz.

19. The part according to claim 1, wherein the part is for an aircraft turbine engine.

20. The part according to claim 1, wherein the body comprises weft yarns made of fibers and warp yarns made of fibers, the weft yarns being woven in three-dimensions with the warp yarns, said at least one conductive wire of the crack sensor being woven with the weft yarns and the warp yarns.

21. The part according to claim 20, wherein said at least one conductive wire of the crack sensor comprises at least a weft portion which extends following the weft yarns and a warp portion which extends following the warp yarns.

22. The part according to claim 1, wherein the link element comprises an RFID tag which is configured to wirelessly transmit the signal(S) when the measured resistance of the conductive wire is above a predetermined threshold, the RFID tag comprising a ball of dielectric material which protects an electronic chip of the RFID tag and an electrical connection to an antenna of the RFID tag.

23. The manufacturing method according to claim 10, wherein the resin injected during step c) is an organic or polymer resin.

24. The manufacturing method according to claim 10, wherein the preform comprises weft yarns made of fibers and warp yarns made of fibers, the weft yarns being woven in three-dimensions with the warp yarns by means of a loom, said at least one conductive wire of the crack sensor being woven with the weft yarns and the warp yarns of the preform by means of the loom during the insertion step a).

25. The manufacturing method according to claim 10, wherein the injection step c) is preceded by a step of electrically insulating the link element.

* * * * *